US009253717B2

(12) United States Patent
Kim et al.

(10) Patent No.: US 9,253,717 B2
(45) Date of Patent: Feb. 2, 2016

(54) METHOD AND TERMINAL FOR SELECTING AP (71) Applicant: LG Electronics Inc., Seoul (KR)

(72) Inventors: Tae Hyeon Kim, Seoul (KR); Lae Young Kim, Seoul (KR); Jae Hyun Kim, Seoul (KR); Hyun Sook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 105 days.

(21) Appl. No.: 14/132,200

(22) Filed: Dec. 18, 2013

(65) Prior Publication Data

US 2014/0204903 A1 Jul. 24, 2014

Related U.S. Application Data (60) Provisional application No. 61/821,725, filed on May 10, 2013, provisional application No. 61/821,667, filed on May 9, 2013, provisional application No. 61/818,916, filed on May 3, 2013, provisional application No. 61/807,301, filed on Apr. 1, 2013, provisional application No. 61/767,196, filed on Feb. 20, 2013, provisional application No. 61/753,939, filed on Jan. 18, 2013.

(51) Int. Cl.
*H04W 48/18* (2009.01)

(52) U.S. Cl.
CPC .................................. *H04W 48/18* (2013.01)

(58) Field of Classification Search
None
See application file for complete search history.

(56) References Cited

U.S. PATENT DOCUMENTS

| 2013/0012260 A1* | 1/2013 | Salkintzis et al. ......... 455/550.1 |
| 2013/0242965 A1* | 9/2013 | Horn et al. ..................... 370/338 |
| 2014/0023059 A1* | 1/2014 | Gupta ............................ 370/338 |
| 2014/0092886 A1* | 4/2014 | Gupta ............................ 370/338 |
| 2014/0171078 A1* | 6/2014 | Ryerson ..................... 455/435.2 |

* cited by examiner

*Primary Examiner* — Alex Skripnikov
(74) *Attorney, Agent, or Firm* — Morgan, Lewis & Bockius LLP

(57) ABSTRACT

There is provided a method for selecting an access point (AP), the method performed by a user equipment. The method may comprise: receiving a prioritized list with respect to APs, the prioritized list includes at least one of roaming consortium information, a network address identifier (NAI), a public land mobile network (PLMN) identifier; scanning at least one or more APs in the vicinity thereby generating an available list which includes at least one or more service set identifiers (SSIDs) and roaming consortium information; acquiring at least one or more NAIs from the roaming consortium information in the available list using pre-stored mapping information; comparing the acquired NAI with the NAI in the prioritized list to select a proper AP.

15 Claims, 9 Drawing Sheets

METHOD AND TERMINAL FOR SELECTING AP

This application claims the benefit of priority of U.S. Provisional applications No. 61/753,939 filed on Jan. 18, 2013, No. 61/767,196 filed on Feb. 20, 2013, No. 61/807,301 filed on Apr. 1, 2013, No. 61/818,916 filed on May 3, 2013, No. 61/821,667 filed on May 9, 2013, and No. 61/821,725 filed on May 10, 2013, of which are incorporated by reference in their entirety herein.

BACKGROUND OF THE INVENTION

1. Field of the Invention

The present invention relates to a method and a terminal for selecting an access point (AP).

2. Discussion of the Related Art

A 3GPP that establishes a technology standard of a $3^{rd}$ generation mobile communication system has started a research into long term evolution/system architecture evolution (LTE/SAE) technology as part of an effort to optimize and improve performance of 3 GPP technologies from the end of 2004 in order to cope with various forums and new technologies associated with $4^{th}$ generation mobile communication.

SAE that is progressed around 3GPP SA WG2 is a research into network technology to determine a structure of a network with an LTE work of a 3GPP TSG RAN and support mobility between model networks and one of key standardization issues of the 3GPP. This is a work for developing a 3GPP system to a system that supports various wireless access technologies based on an IP and the work has been progressed for the purpose of an optimized packet based system that minimizes a transmission delay with a further improved data transmission capability.

An SAE higher-level reference model defined in the 3GPP SA WG2 includes a non-roaming case and a roaming case of various scenarios, and a detailed content may be referred in TS 23.401 and TS 23.402 which are 3GPP standard documents. A network structure diagram of FIG. 1 shows schematic reconfiguration of the SAE higher-level reference model.

Figure 1:
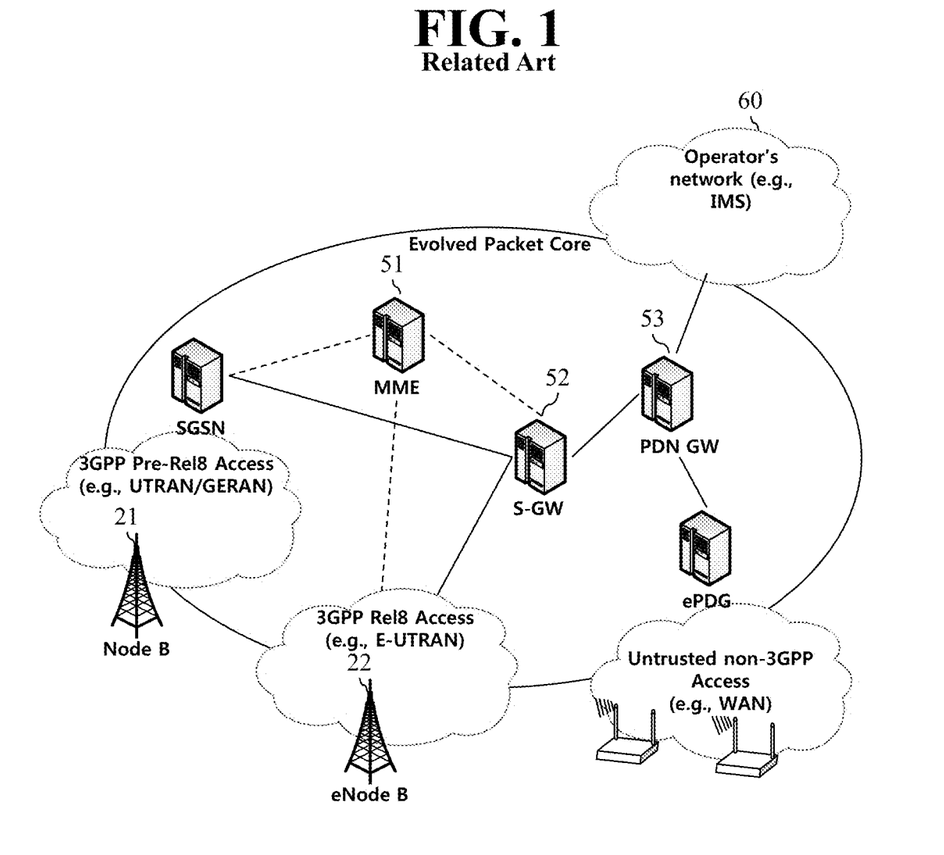
FIG. 1 is a structural diagram of an evolved mobile communication network.

FIG. 1 is a Structural Diagram of an Evolved Mobile Communication Network.

One of largest features of the network structure of FIG. 1 is based on a 2 tier model of eNodeB of an evolved UTRAN and a gateway of a core network and although accurately matches each other, the eNodeB 20 has functions of NodeB and RNC of an existing UMTS system and the gateway has an SGSN/GGSN function of the existing system.

Another key feature is that a control plane and a user plane between an access network and the core network are exchanged to different interfaces. In the existing UMTS system, one Iu interface exists between an RNC and an SGSN, while a mobility management entity (MME) 51 that undertakes processing of a control signal has a structure separated from a gateway (GW), and as a result, two interfaces of S1-MME and S1-U are respectively used. The GW includes a serving-gateway (hereinafter, referred to as 'S-GW') 52 and a packet data network gateway (hereinafter, referred to as 'PDN-GW' or 'P-GW') 53.

Meanwhile, in recent years, congestion of a core network of a mobile communication provider has been aggravated with an explosive increase of data. As a scheme for relieving the aggravated congestion, there is a discussion intended to offload data of a user terminal to a wired network without passing through a core network of a provider. As a result of such a discussion, technologies such as IP flow mobility and seamless offload (IFOM), multi access PDN connectivity (MAPCON), etc. for supporting multiple radio access have been proposed. The MAPCON technology establishes PDN connections through their preferred radio access such as 3GPP access or Wi-Fi access and transmits data through the PDN connections. The IFOM technology allows a PDN connection to use 3GPP access and Wi-Fi access simultaneously and transmits data through their preferred access.

Figure 2A:
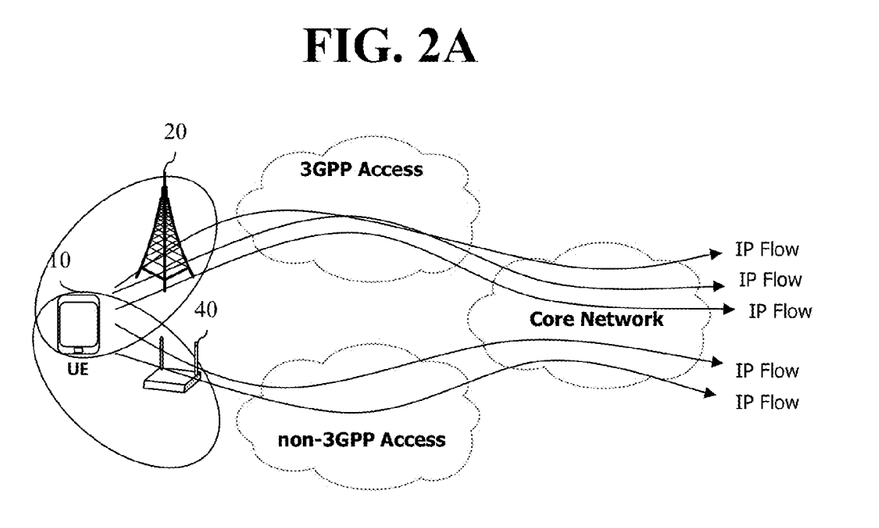
FIG. 2A is an exemplary diagram illustrating an example of IFOM technology.

FIG. 2A is an Exemplary Diagram Illustrating an Example of IFOM Technology.

Referring to FIG. 2A, the IFOM provides the same PDN connection through various different accesses simultaneously. The IFOM provides offloading to a seamless WLAN.

Further, the IFOM transfers an IP flow of one same PDN connection from one access to another access.

Figure 2B:
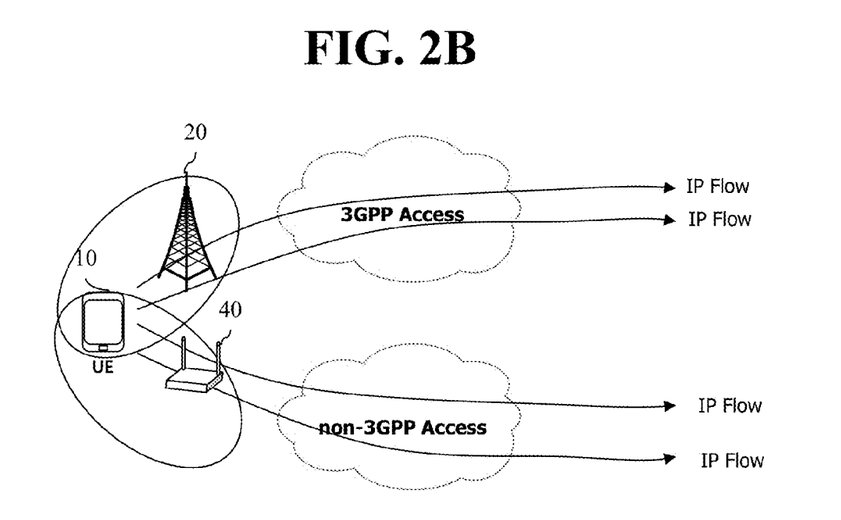
FIG. 2B is an exemplary diagram illustrating an example of MAPCON technology.

FIG. 2B is an Exemplary Diagram Illustrating an Example of MAPCON Technology.

As known with reference to FIG. 2B, the MAPCON technology easily connects IP flows of various PDN connections to other APNs through different access systems.

According to the MAPCON technology, a UE 10 may create a new PDN connection on an access which is not previously used. Alternatively, the UE 10 may create a new PDN connection to one selected from various accesses which are previously used. Alternatively, the UE 10 may transfer all or some of all PDN connections which are already connected to another access.

Technology associated with Wi-Fi interworking includes traffic offloading technology and technology associated with WLAN selection. That is, technology in which a terminal can automatically select a WLAN is standardized (3GPP TS 24.234) and an associated operation is described below. First, the terminal searches neighboring Wi-Fi to create a list of available WLANs. This is a list of SSIDs expressing the WLANs. The created list and a preferred WLAN list are compared with each other to select the most preferred WLAN in the created list. An ANQP query is transmitted to the selected WLAN to acquire PLMN information which is providable by the WLAN. The most preferred PLMN (for example, Home PLMN) is selected by comparing the acquired PLMN information to preferred PLMN information which is stored in advance and is used to access to the corresponding PLMN through an authentication process.

Figure 3:
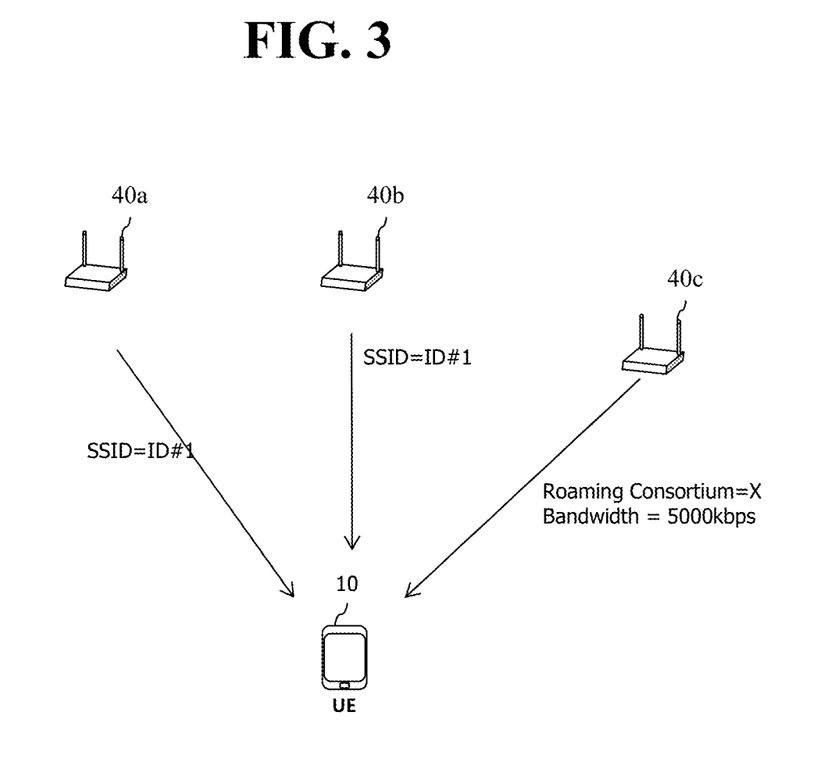
FIG. 3 illustrates an environment in which a general AP and a recently discussed hotspot 2.0 AP are present.

FIG. 3 Illustrates an Environment in which a General AP and a Recently Discussed Hotspot 2.0 AP are Present.

An traditional HotSpot meant that a Wi-Fi service is provided to an unspecific majority in a public place where a floating population is large. However, with a recent explosive increase in a bandwidth usage, it is difficult to sufficiently provide a bandwidth required as $3^{rd}$ generation or $4^{th}$ generation mobile communication technology now. In particular, in a commercial area in which a population is dense during the daytime, bandwidth management is actually impossible and a HotSpot 2.0 that makes a mobile communication network in a population dense area interwork with a Wi-Fi network to provide a Vertical Handoff service is researched in order to solve such a problem.

The HotSpot 2.0 as a standard developed in Wi-Fi Alliance (WFA) aims at simplifying and automating access to a public Wi-Fi network. A mobile terminal aims at recognizing which AP among various neighboring access points is suitable for a usage purpose thereof and authenticating the corresponding AP from a remote service provider by using appropriate credentials. To this end, the respective APs is allowed to provide new various information, and information indicating whether a specific service provider is connectable, a HotSpot provider, a roaming consortium, Venue information (Venue Group, Venue Type), configuration information can be provided.

Herein, the roaming consortium is a group of service providers that make a roaming agreement. Numerous service set identifiers (SSIDs) that are managed for each roaming consortium may be present according to the roaming consortium and a 3GPP provider who cooperates with the roaming consortium may not know all of numerous SSIDs. Accordingly, a HotSpot 2.0 AP 40c provides roaming consortium information to increase efficiency of management instead of the numerous SSIDs.

The roaming consortium information is constituted by a list of a service provider or a company or an agency that made a roaming agreement with the service provider. Herein, information of each company or agency is expressed as an organizational unique identifier (OUI). That is, the roaming consortium information is configured in a list form of OUI1, OUI2, . . . , OUI_n. Herein, the OUI can be used by being registered in IEEE, and is information which is unique for each agency. Further, the HotSpot 2.0 AP 40c may provide BSS load information or bandwidth information (for example, WAN Metrics).

Meanwhile, as illustrated, under a situation in which the hotspot 2.0 AP 40c and general APs 40a and 40b coexist, the UE 10 receives SSID information from the general APs 40a and 40b and the roaming consortium information from the hotspot 2.0 AP 40c.

However, since a 3GPP release 11 based UE 10 which has been developed up to now may select only the general APs 40a and 40b based on only the SSID and may not read the roaming consortium information, the UE 10 may not select the hotspot 2.0 AP 40c.

In detail, the UE 10 provides only SSID information in order to select the AP in a 3GPP network in prior art. According to 3GPP release 11, AP selection, that is, WLAN selection has been developed aiming at selecting a public land mobile network (PLMN). As a result, the UE 10 receives SSIDs broadcasted from the APs 40a and 40b to create an available list and thereafter, accesses respective APs in order of the SSIDs selected by comparing a preference list stored in advance and information on the created list and reads PLMN list information supported by the APs. The PLMN information is also compared with a preference PLMN list to select a PLMN having the highest preference. When the PLMN selection is completed, the AP is accessed by using the corresponding SSID to access the corresponding PLMN.

As described above, since the 3GPP release 11 based UE 10 which has been developed up to now may select only the general APs 40a and 40b based on only the SSID and may not select the hotspot 2.0 AP 40c.

SUMMARY OF THE INVENTION

The present disclosure has been made in an effort to allow a UE to correctly select an AP.

In detail, the present disclosure has been made in an effort to provide a scheme that allows a recently developed Hotspot 2.0 to be used even in a 3GPP network system. In particular, the present disclosure has been made in an effort to enhance a method for selecting an AP by using information provided by a Hotspot 2.0 AP.

In one aspect, there is provided a method for selecting an access point (AP), the method performed by a user equipment. The method may comprise: receiving a prioritized list with respect to APs, the prioritized list includes at least one of roaming consortium information, a network address identifier (NAI), a public land mobile network (PLMN) identifier; scanning at least one or more APs in the vicinity thereby generating an available list which includes at least one or more service set identifiers (SSIDs) and roaming consortium information; acquiring at least one or more NAIs from the roaming consortium information in the available list using pre-stored mapping information; comparing the acquired NAI with the NAI in the prioritized list to select a proper AP.

The acquiring of the NAI may include: extracting an organization unique identifier (OUI) from the roaming consortium information in the available list; and acquiring an NAI corresponding to the extracted OUI by using the pre-stored mapping information.

The pre-stored mapping information may include an NAI and a PLMN ID corresponding to an OUI.

The method may further comprise: comparing the PLMN ID acquired from the mapping information and the PLMN ID in the preference list with each other.

The method may further comprise: associating, when an NAI and a PLMN ID which match the NAI and the PLMN ID in the preference list are present, a corresponding AP; and performing authentication by using the PLMN ID.

The scanning may include: receiving information on a load and an installation place of the corresponding AP through the AP scanning; excluding an AP which does not match a predetermined condition from the available list; and filling the AP which matches the predetermined condition in the available list.

The predetermined condition may include at least one of a condition for the load of the AP and a condition for the load for the installation place of the AP.

an entity in a network providing the preference list is an access network discovery and selection function (ANDSF).

In one aspect, there is provided a terminal comprising: a transmitting/receiving unit receiving a prioritized list with respect to APs from an entity in a network, the prioritized list includes at least one of a roaming consortium information, a network address identifier (NAI), and a public land mobile network (PLMN) identifier; and a processor scanning APs in the vicinity thereby generating an available list including a service set identifier (SSID) and the roaming consortium information, acquiring an NAI from the roaming consortium information in the available list, and comparing the acquired NAI with an NAI in the preference list.

According to the present disclosure, a UE that supports a Hotspot 2.0 AP can effectively select an AP. Further, according to the present disclosure, a time required to select the AP can be significantly reduced.

DETAILED DESCRIPTION OF THE EMBODIMENTS

Hereinafter, terms used in the specification will be defined in brief in order to assist understanding the present invention before a description referring the accompanying drawings.

UMTS: means a $3^{rd}$ generation mobile communication network as an abbreviation of a Universal Mobile Telecommunication System EPS: Means a core network supporting a long term evolution (LTE) network as an abbreviation of Evolved Packet System. Network evolved from the UMTS PDN (Public Data Network): An independent network at which a server providing a service is positioned APN (Access Point Name): Provided to UE as a name of an access point managed in the network. That is, the APN indicates a name (string) of the PDN. The corresponding PDN for transmitting and receiving data is decided based on the name of the access point.

NodeB: Installed outdoor as a base station of the UMTS network and a cell coverage scale corresponds to a macro cell.

eNodeB: Installed outdoor as a base station of an evolved packet system (EPS) and the cell coverage scale corresponds to the macro cell.

MME: Serves to control each entity in the EPS in order to provide a session for the UE and mobility as an abbreviation of Mobility Management Entity.

Session: The session is a passage for data transmission and the unit thereof may be PDN, bearer, IP flow unit, or the like. The respective units may be divided into a whole unit (APN or PDN unit) of a target network, a unit (Bearer unit) divided as a QoS therein, and a destination IP address unit.

PDN connection: Indicates connection from the terminal to the PDN, that is, association (connection) between the terminal expressed as the IP address and the PDN expressed as the APN. The PDN connection means connection between entities (terminal—PDN GW) in the core network so as to form the session.

UE Context: UE context information used to manage the UE in the network, that is, context information constituted by a UE id, mobility (present location, and the like), an attribute (QoS, priority, and the like) of the session Service Set ID (SSID): an identifier of a WLAN AP defined in the IEEE 802.11

ANDSF (Access Network Discovery and Selection Function): As one network entity, a policy is provided to discover and select access which the terminal can use by the unit of the provider Brief Description of Technology Presented in Specification Meanwhile, hereinafter, schemes presented in the specification will be described below in brief.

First, a 3GPP based access network discovery and selection function (ANDSF) performs a network search function and a data management and control function for providing selective assistance data according to a provider policy.

The existing ANDSF needs to designate an ID of a WLAN in order to decide access preference and the ID may be provided only in a form of a service set identifier. However, an ANDSF enhanced according to an embodiment of the present invention may provide a preference list defined by using information provided an Hotspot 2.0 AP which has been recently developed. For example, a preference list is constituted by a network address ID (for example, a network address identifier (NAI) realm) of a provider or a roaming consortium organizational identifier (OI) in addition to the SSID. The NAI realm information is address information of a character string pattern such as attwireless.com. Both information of the OUI and the NAI realm is different individual information having different formats, but a service provider may express itself by using the two formats due to the common point of expressing service providers.

Figure 4A:
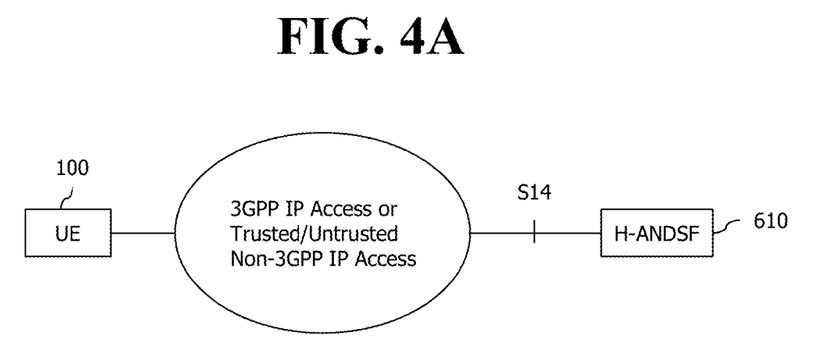
FIGS. 4A and 4B illustrate a network control entity for selecting an access network.
Figure 4B:
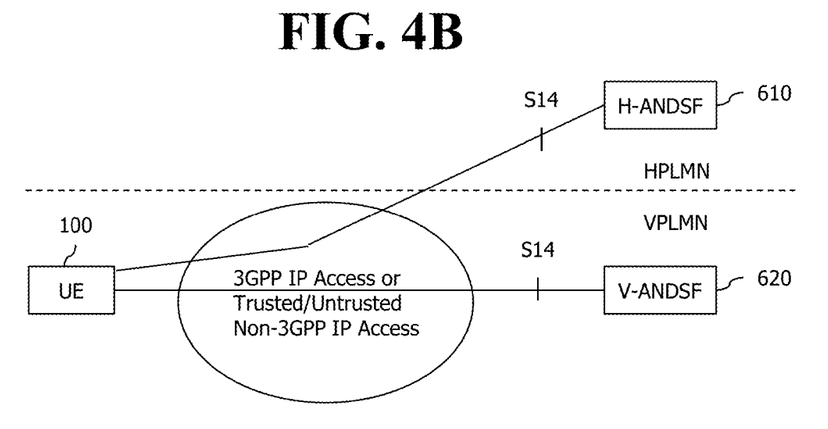

FIGS. 4A and 4B Illustrate a Network Control Entity for Selecting an Access Network.

As known with reference to FIG. 4A, the ANDSF may be present in a home public land mobile network (hereinafter, 'HPLMN') of a UE 100. Further, as known with reference to FIG. 4B, the ANDSF may be present even in a visited public land mobile network (hereinafter, referred to as 'VPLMN') of the UE 100. As such, when the ANDSF is positioned on the home network, the ANDSF may be called H-ANDSF 610 and when the ANDSF is positioned on the visited network, the ANDSF may be called V-ANDSF 620. Hereinafter, the ANDSF 600 is commonly called the H-ANDSF 610 or the V-ANDSF 620.

The ANDSF may respond to a request of the UE to access network discovery information and further, transmit information as necessary even though there is no request from the UE.

The ANDSF may provide information on an inter-system mobility policy, information for discovery of the access network, and information on an inter-system routing, for example, a routing rule.

The information on the routing, for example, the routing rule may include an AccessTechnology, an AccessId, AccessNetworkPriority, and the like.

Technology called the ANDSF is started as technology that provides a policy for mobility between heterogeneous network. However, according to a disclosure of the specification, when legacy APs and the Hotspot 2.0 APs are present in plural, ANDSF provides information for the UE to select any AP.

A detailed example will be described with reference to FIG. 5.

Figure 5:
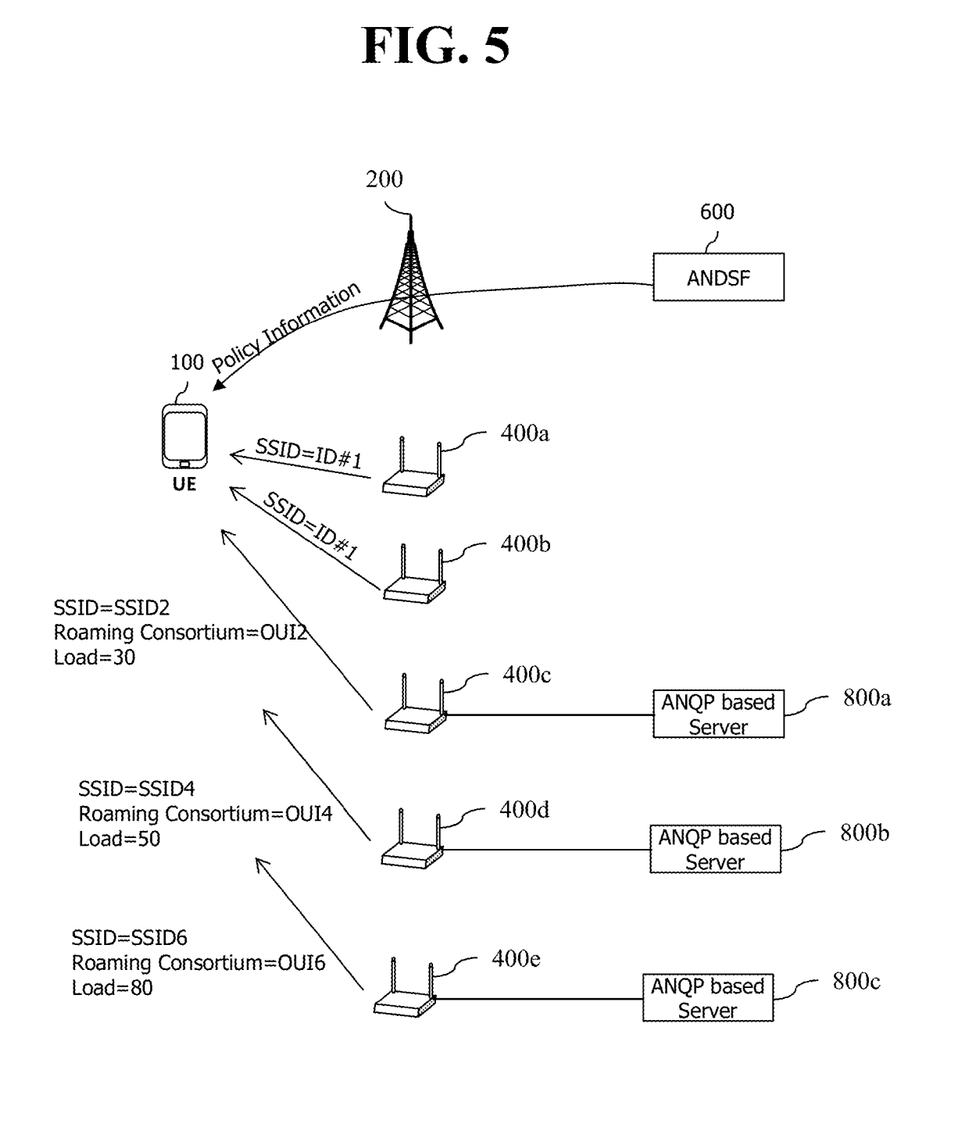
FIG. 5 is an exemplary diagram illustrating an environment assumed in this specification.
Figure 6:
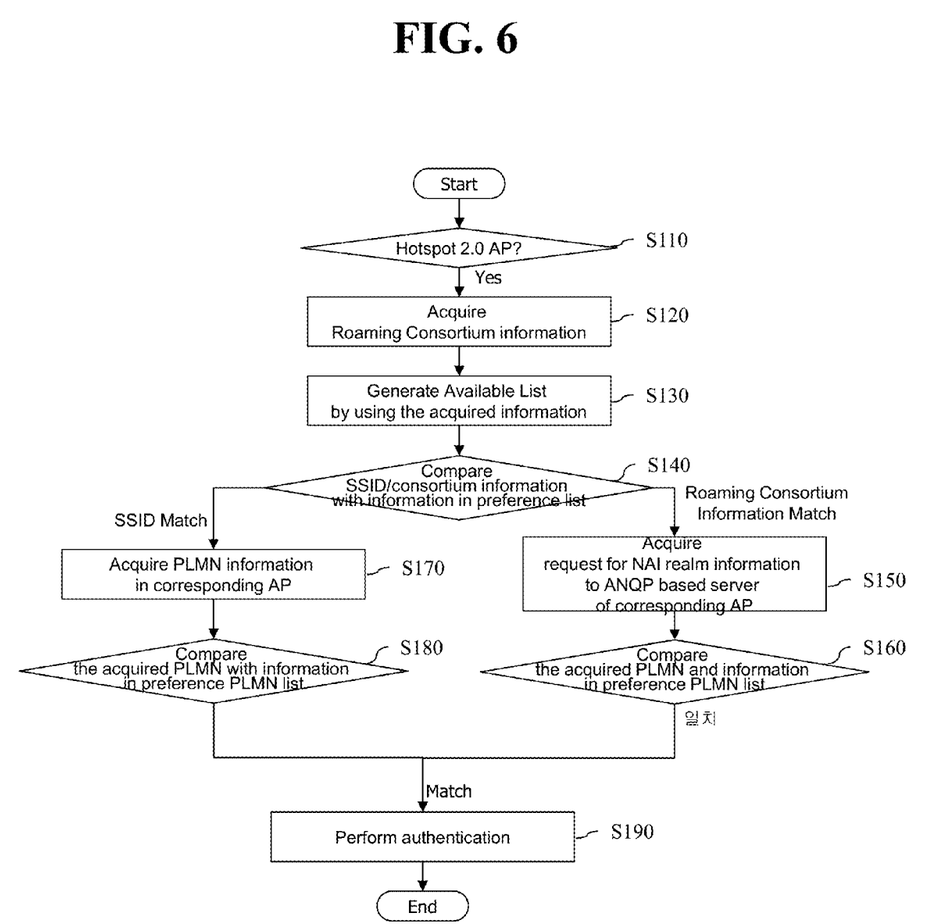
FIG. 6 is a flowchart illustrating a scheme according to a first exemplary embodiment presented in this specification under the environment illustrated in FIG. 5.

FIG. 5 is an Exemplary Diagram Illustrating an Environment Assumed in this Specification. FIG. 6 is a Flowchart Illustrating a Scheme According to a First Exemplary Embodiment Presented in this Specification Under the Environment Illustrated in FIG. 5.

As known with reference to FIG. 5, it is assumed that general APs 400a and 400b are present and several Hotspot 2.0 APs 400c, 400d, and 400e are present.

As illustrated, the general APs 400a and 400b broadcast the SSID. The hotspot 2.0 APs 400c, 400d, and 400e broadcast roaming consortium information as well as SSID. Further, the hotspot APs 400c, 400d, and 400e provide information on an access network type regarding whether each hotspot AP 400c, 400d, or 400e is private, public, free, or personal. Further, the hotspot APs 400c, 400d, and 400e may provide venue information. For example, the hotspot APs 400c, 400d, and 400e may provide place type information regarding whether an installation space is, for example, a school, a hospital, a hotel, an office, a home, or the like.

The hotspot APs 400c, 400d, and 400e are connected with access network query protocol based servers 800a, 800b, and

800c illustrated, respectively. The ANQP based servers 800a, 800b, and 800c provide the NAI realm according to a request.

Hereinafter, information provided through Hotspot 2.0 technology which is organized will be illustrated in Table 1 below.

TABLE 1

| Information broadcasted in AP | Information provided through ANQP based server |
|---|---|
| 1. SSID<br>2. Roaming Consortium ID<br>3. Venue information (Venue Group, Venue Type)<br>4. BSS Load information | 1. Roaming Consortium ID list<br>2. NAI Realm list |

Meanwhile, according to related art, the ANDSF 600 provides only SSID information for selecting an access network, for example, an AP.

However, according to embodiments presented in the specification, the ANDSF 600 may provide the preference list using the roaming consortium information or the NAI realm information in addition to the SSID. The preference list is illustrated in Table 2.

TABLE 2

| PrioritizedAccess |
|---|
| AccessTechnology<br>AccessId<br>SecondaryAccessId<br>AccessNetworkPriority<br>NAI Realm<br>Roaming Consortium ID |

The preference list illustrated in Table 2 above shows preferred accesses which are arranged. The preferred accesses may include access technology, an access ID, a secondary access ID, an access network priority, NAI realm, a roaming consortium ID, and the like. The NAI realm and the roaming consortium ID may be designated in plural and expressed according to the priority.

Then, as illustrated in FIG. 6, the UE 100 acquires information from several APs 400a, 400b, 400c, 400d, and 400e and compares the information with the information in the preference list to select any one AP.

In detail, if a predetermined AP among several APs 400a, 400b, 400c, 400d, and 400e is the hotspot 2.0 AP (S110), the UE 100 acquires the broadcasted SSID and roaming consortium ID (S120).

Subsequently, the UE 100 creates an available list by using the acquired information (for example, the SSID or the roaming consortium ID) (S130).

In addition, the UE 100 compares the SSID or the roaming consortium ID in the available list with the SSID or the roaming consortium ID in the preference list illustrated in FIG. 6 (S140).

According to a result of the comparison, if the matched SSID is the highest priority, PLMN information is acquired by accessing the corresponding AP (S170).

Subsequently, a public land mobile network (PLMN) ID acquired from the corresponding AP and information of a preferred PLMN list are compared with each other (S180).

When the PLMN ID is matched, the PLMN is selected and authentication is performed (S190).

On the contrary, according to the comparison result (S140), if the roaming consortium ID which is matched has the highest priority, the NAI realm information is requested and acquired from the ANQP based servers 800a, 800b, and 800c of the corresponding AP (S150).

Subsequently, the acquired NAI realm and the NAI realm in the preference list are compared with each other (S160).

When the NAI realm is matched, the authentication is performed by using the NAI realm (S190).

As described above, under an environment in which the general APs 400a and 400b, and the hotspot 2.0 APs 400c, 400d, and 400e coexist, information broadcasted by the respective APs may be different from each other and the UE 100 may select any one AP according to the preference list provided by the ANDSF 600.

However, according to the first embodiment, in order to select and access the hotspot 2.0 AP, the NAI realm is queried to the ANQP based servers 800a, 800b, and 800c and acquired and thereafter, compared with the NAI realm in the preference list provided by the ANDSF 600.

However, a time required to query and acquire the NAI realm is relatively longer than a time required to acquire the SSID. In the worst case, when the number of hotspot 2.0 APs is considerably large, quite a long time may be taken to query and acquire the NAI realm to the ANQP based servers of all APs.

Meanwhile, the hotspot 2.0 APs 400c, 400d, and 400e provide various additional information, the venue information (Venue Group and Venue Type), BSS load information, and the like, but according to the first embodiment, the information may not be used in selecting the AP. For example, even though an AP having a large load may be allowed not to be selected when load information is used, the information may not be used in the first embodiment.

Accordingly, other embodiments capable of solving a disadvantage of the first embodiment will be described.

A method according to other embodiments will be summarized below in brief in order to assist understanding.

As one method, the UE 100 may store the preference list for the SSID or the roaming consortium ID (OUI) in advance in order to rapidly select the AP.

As another method, since the NAI realm represents the network address ID of the provider and the OUI in the roaming consortium ID represents information on each company or agency, the NAI realm and the OUI have a correspondence relationship. For example of a company in LG, the OUI may be LGI and the NAI realm may be LG.com. Accordingly, when the UE 100 stores mapping information indicating the correspondence relationship in advance and thereafter, receives the preference list from the ANDSF server, the NAI realm in the corresponding preference list is converted into the OUT according to the mapping information and compared with the OUI in the roaming consortium broadcasted from the hotspot 2.0 AP to select an AP to be accessed. Subsequently, the PLMN ID is acquired from the accessed AP and a best PLMN or service provider is selected and authenticated.

As another method, the UE 100 stores service provider information (for example, NAI realm(s) and PLMN ID) which is accessible for each OUI in advance, rapidly selects the AP by using the stored information, and moreover, completes even authentication.

Figure 7:
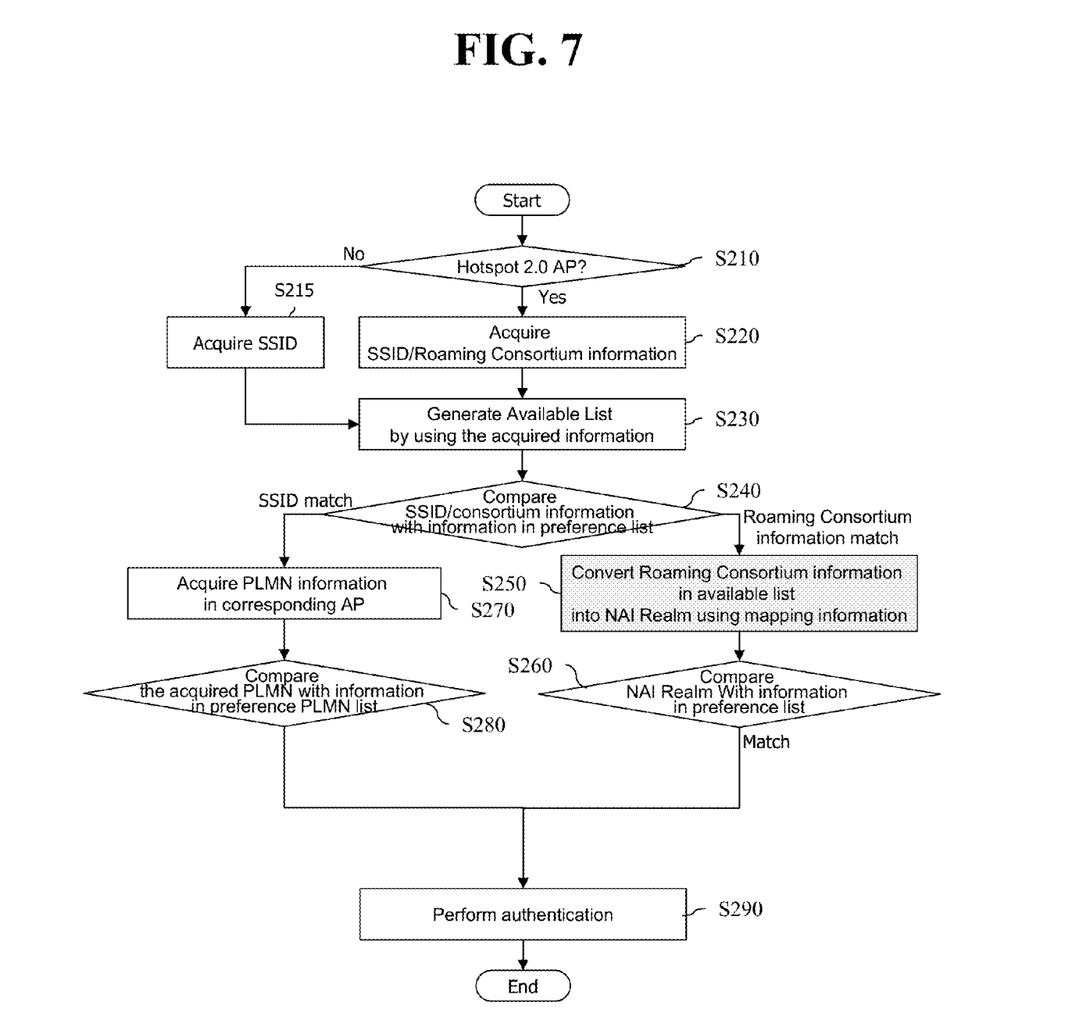
FIG. 7 is a flowchart illustrating a scheme according to a second exemplary embodiment presented in this specification under the environment illustrated in FIG. 5.

FIG. 7 is a Flowchart Illustrating a Scheme According to a Second Exemplary Embodiment Presented in this Specification Under the Environment Illustrated in FIG. 5.

First, according to the IEEE 802.11 standard, since the roaming consortium ID is defined as "each OI (Organizational Identifier) identifies an SSP (Subscription Service Provider) or group of SSPs (i.e, a roaming consortium)" and the OI is expressed as the OUI, the OUI may be acquired through the roaming consortium ID. Further, for example, since the OUI is expressed as LGI and the NAI realm is expressed as LG.com, the second embodiment enables more rapid AP selection by using the correspondence relationship between the NAI realm and the OUI.

That is, according to the second embodiment, an appropriate AP may be selected even without directly using the ANQP query to the AP by appropriately using broadcasted information. First, when an associated AP fails to access at the time of attempting access by selecting the best PLMN or service provider, another AP is associated to attempt access again by selecting the best PLMN or the service provider.

As such, an AP to be access is selected depending on only the broadcasted information to increase a probability of acquiring a best result within a short time. Further, the NAI realm is not queried and requested from an ANQP server of an AP not to be actually accessed, and as a result, unnecessary signaling generation may be reduced.

Meanwhile, according to the second embodiment, the ANDSF exemplarily provides an enhanced preference list illustrated in Table 3. As known with reference to Table 3, the enhanced preference list may include a list (for example, Operator_Controlled_WLAN_Specific_identifier_List) for selecting the AP (that is, the WLAN) and a list (for example, Operator_Controlled_PLMN_Selector_for_WLAN_access_List) for selecting the PLMN.

Unlike Table 2, in Table 3, the roaming consortium ID is included in the list for selecting the AP (that is, the WLAN) and the NAI realm is included in the list for selecting the PLMN.

TABLE 3

Operator_Controlled_WLAN_Specific_identifier_List

SSID
Roaming Consortium ID
Priority
Operator_Controlled_PLMN_Selector_for_WLAN_access_List NAI Realm
PLMN_ID
Priority The list (for example, Operator_Controlled_WLAN_Specific_identifier_List) for selecting the AP (that is, the WLAN) is used to select an AP which the UE 100 will associate. The list for selecting the AP (that is, the WLAN) may include at least one of the SSID and the roaming consortium ID, and any of them can take precedence over the other one according to the priority. If the priority is not designated, the priority may be substituted with an order disclosed in the list. Alternatively, the NAI realm may be described instead of the roaming consortium ID. In this case, as described above, the mapping information indicating the corresponding relationship between the OUI and the NAI realm in the roaming consortium information is required. That is, the mapping information may be provided by a server or stored in a terminal through the provider or network configuration. The mapping information may include the PLMN ID in addition to the correspondence relationship between the OUI and the NAI realm.

Meanwhile, plural PLMN ids and NAI realms may be described in the list for selecting the PLMN and a priority among the plural PLMN ids and NAI realms may be decided by the priority. The list is intended to be used for selecting the PLMN, but alternatively, may be referred even when the UE 100 creates the available list. That is, the UE 100 may extract/estimate the roaming consortium ID by using the NAI realm information of the list for selecting the PLMN and thus, select an AP to be first associated by using the OUI. In this case, the priorities of the list for selecting the AP (that is, the WLAN) and the list are equally used or any one list may be preferentially used.

According to the second embodiment, an overall process is progressed by an order of a scanning process (S210 to S230), an AP selecting process (S240), and a PLMN selecting process (S250 to S270) are progressed in sequence. Each process will be described below.

In the scanning process (S210 to S230), the UE 100 acquires only the SSID in the case of not the Hotspot 2.0 AP but the legacy AP (S215), acquires the SSID and the roaming consortium information (including the OUI) broadcasted from the Hotspot 2.0 AP (S220), and creates the available list (S230). For example, an example of the available list created when three neighboring hotspot 2.0 APs 400c, 400d, and 400e are searched like the environment illustrated in FIG. 5 is illustrated below.

TABLE 4

Ex.) Available WSID list: (SSID2, OUI2), (SSID4, OUI4), (SSID6, OUI6)

Next, when the AP selecting process (S240) is described, the UE 100 first compares the information in the available list and information defined in the list for selecting the AP (that is, the WLAN) of Table 3 for each priority. For example, it is assumed that the list (WLAN_Specific_identifier_List) for selecting the AP (that is, the WLAN) is illustrated as an example in a table below.

TABLE 5

Ex.) WLAN_Specific_identifier_List: (-,OUI1), (-, OUI2), (SSID3, OUI3), (SSID4, -)

Since a part expressed as '-' is not designated, the part is analyzed as any.

When the available list exemplified above and the list for selecting the AP (that is, the WLAN) exemplified above are compared with each other, an AP is selected in order of (-, OUI2) and (SSID4, -).

Next, the PLMN selecting process (S250 to S270) will be described below.

First, the UE 100 converts the roaming consortium information in the available list for the selected AP into the NAI realm by using the mapping information (S250). As described above, the OUI in the roaming consortium information may represent the service provider or a group thereof. That is, since one OUI represents various service providers, one OUI is associated with various service providers. Accordingly, when the AP supports a specific OUI, the UE 100 may access a service provider network associated with the OUI. In this case, the authentication process (S290) to be described below is performed in order to access the service provider network, and the NAI realm and the PLMN ID information acquired through the mapping information may be used in the authentication process (S290) to be described below. The mapping information may be transferred in the network or stored in the terminal in advance in a form of a policy or set-up. A table below illustrates an example thereof.

TABLE 6

| |
|---|
| OUI_i = {ServiceProvider_1(NAI_11, NAI_12,PLMN_id_13...), ServiceProvider_2(NAI_21, NAI_22, ...), ... , ServiceProvider_n(NAI_n1, NAI_n2,...)} |

Alternatively, when there is no mapping information, the NAI realm and the PLMN ID may be acquired by querying to the ANQP 800a, 800b, or 800c of each AP.

Then, the UE 100 compares the NAI realm acquired from the ANQP 800a, 800b, or 800c of each AP with the NAI realm/PLMN ID in the list (for example, Operator_Controlled_PLMN_Selector_for_WLAN_access_List) for the NAI realm in the preference list, that is, the PLMN (S260).

When the NAI realm/PLMN ID is matched, the UE 100 associates the NAI realm/PLMN ID to the corresponding AP, the UE 100 performs authentication, for example, AAA authentication (S290). However, when the NAI realm/PLMN ID of the corresponding AP does not match the NAI realm/PLMN ID in the preference list, the aforementioned processes are repeated with respect to another AP in the available list. Meanwhile, the UE 100 may appropriately modify the NAI by considering the situation of the Home PLMN or the Visited PLMN at the time of performing the authentication. That is, the UE 100 selects a service provider which is preferred in the corresponding OUI, and modifies the NAI according to the PLMN so that the UE accesses to the PLMN.

Meanwhile, when the UE 100 selects the specific AP as described above, the service provider is thereafter selected by comparing the NAI realm and when the same preference is provided, the service provider may be selected by using individual preference lists.

Further, like an OUI_i list illustrated in Table 6 above, several service providers may be arranged with respect to one OUI and the priority may be given to the order. In a general case, if a Home provider of the UE 100 is included in the corresponding roaming consortium, the UE 100 hopes accessing primarily by using the Home provider and even in remaining cases, a service provider which is preferred may be selected according to a roaming agreement. Accordingly, the authentication may be performed according to the corresponding order. The corresponding home provider may be preferred by using an indicator or a setting value in order to preferentially select the home provider.

Further, the OUI_i list is stored based on a record which is succeeded after access through method 1 and thereafter, may be used at the time of an attempt.

Optionally, the UE 100 may perform authentication by an option below by using the service provider (NAI realm) acquired through the query to the ANQP server 800a, 800b, or 800c by accessing the AP in the order of the preference OUI.

A predetermined service provider (NAI realm) among the service providers in the OUI having the highest preference is selected and authenticated. (without a priority list of the service provider)

The service provider having the highest preference is selected among the service providers in the OUI having the highest preference (the priority list of the service provider which is preferred for each OUI is used).

Authentication is performed with the service provider having the highest priority among the service providers (NAI realms) that receive responses from the ANQP 800a, 800b, and 800c of the APs of all OUIs (a priority list of common service providers is used). In this case, Home or the PLMN preferred during roaming may be designated and selected.

According to the second embodiment illustrated in FIG. 7 as above, when N APs are present therearound, the number of operating times may be reduced as illustrated in Table 7 below.

First, the scanning process is performed similarly to N neighboring APs.

The number of querying times to the ANQP server requires average N/twice because the NAI realm information or the PLMN information is acquired by arbitrary visitation in the case of the method by the first embodiment. However, according to the second embodiment, the access is performed by considering the priority in the OUI information acquired from the broadcasted roaming consortium ID. In this case, when a correlation between the OUI in the mapping information and the NAI realm or the PLMN is high (that is, when the correlation is 1), the access is performed only once. When the correlation is low, since the method is the same as the existing method even in the worst case, the access may be performed at N/twice. The average number is set as N/4, but when the available list is substantially searched, it is possible that the successful access can be achieved with one or two times of trial.

TABLE 7

| | Full search | Present invention |
|---|---|---|
| # of Scanning | N | N |
| # of ANQP (when OUI/Realm, PLMN id has no correlation) | N/2 | N/2 |
| # of ANQP (when OUI/Realm, PLMN id has a strong correlation) | N/2 | 1 |
| # of ANQP (an average of two above cases) | N/2 | N/4 |

Figure 8:
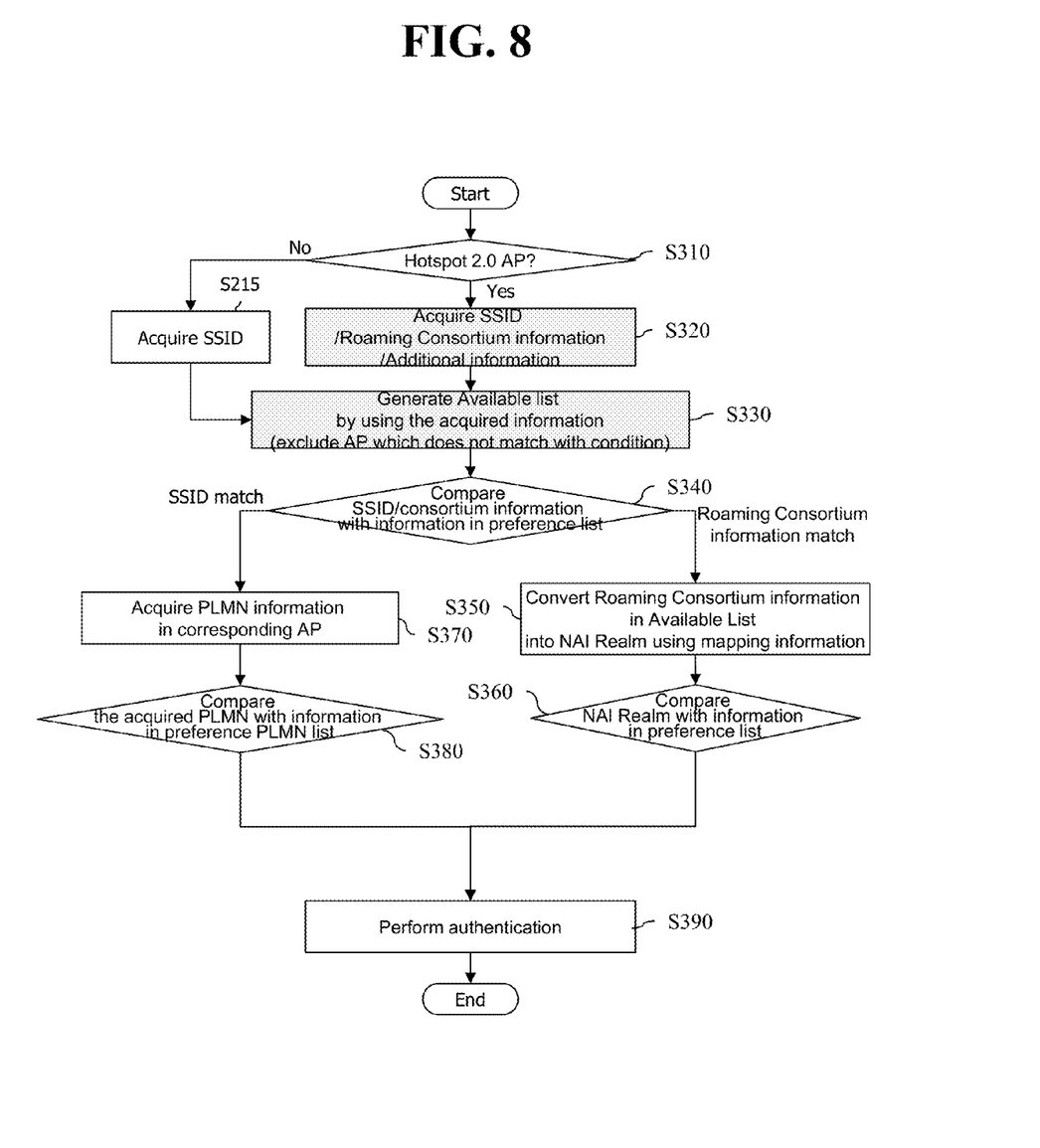
FIG. 8 is a flowchart illustrating a scheme according to a third exemplary embodiment presented in this specification under the environment illustrated in FIG. 5.

FIG. 8 is a Flowchart Illustrating a Scheme According to a Third Exemplary Embodiment Presented in this Specification Under the Environment Illustrated in FIG. 5.

In the third embodiment, an AP selection is enhanced by using state information. As described above, the Hotspot 2.0 APs 400a, 400c, and 400e broadcast various information indicating a state or a feature of the AP, for example, venue information (Venue Group and Venue Type), BSS load information and the like. Therefore, according to the third embodiment, the UE 100 considers broadcasted additional information and when the additional information does not match a predetermined condition, the UE 100 excludes the APs from the available list. The predetermined condition may be expressed as follows.

TABLE 8

| |
|---|
| Venue Type:any |
| BSS Load < 70 |

In detail, referring to FIG. 8, the UE 100 acquires various information indicating the state or feature from the hotspot 2.0 APs 400a, 400c, and 400e, for example, the venue information (Venue Group and Venue Type), the BSS load information, and the like in addition to the SSID and the roaming consortium information according to the third embodiment.

In addition, the UE 100 excludes the AP that does not match the predetermined condition while creating the available list (S330). As such, the available list may be more simplified by excluding the AP which does not match the condition.

Meanwhile, when the load information is used among the aforementioned various additional information, the UE 100 may select a less-loaded AP. When there is no less-loaded AP, another radio access technology (RAT) may be alternatively selected.

Since other processes illustrated in FIG. 8 are similar as the processes of FIG. 7, a detailed description thereof will be omitted.

Contents which have been described up to now will be organized as below.

The present specification addresses the key issue of "Support WLAN access through roaming agreements. However, it is applicable also to scenarios where WLAN access is provided without roaming agreements.

The present specification proposes to extend the ANDSF selection policies to support also selection policies based on the Realms and/or the Organizational Unique Identifiers (OUIs) which are supported by Hotspot 2.0 compliant WLAN networks. The ANDSF may send policies to UE based on Realms and/or OUIs to indicate for example that "WLANs that interwork with Realm=PartnerX.com have the highest access priority". The UE uses the Realms and/or OUIs as an alternative way (instead of using SSID) to identify and prioritize the discovered WLAN access networks.

A Hotspot 2.0 compliant UE is capable to discover the Realms and/or OUIs supported by a specific WLAN access network prior to association by using the applicable discovery procedures (e.g. based on the ANQP protocol) and/or by receiving the beacon transmissions of APs (some OUIs are included in the AP beacon messages).

Roaming consortium OI is an identifier representing an SSP (Subscription service provider) or group of SSPs. One or more service providers can be members of one roaming consortium OI. When a WLAN AP is selected based on roaming consortium OI, a preferred service provider should be derived from the roaming consortium. Therefore, the ANDSF MO is enhanced so that a roaming consortium OI has a list of preferred 3GPP service providers (e.g. realms) including Home PLMN. This list is used by the UE to select a preferred service provider which is related to the preferred roaming consortium. That is, once a preferred roaming consortium is selected, a preferred service provider is selected from the members of the preferred roaming consortium. This can be done by comparing the service providers captured from the WLAN AP and the preferred service provider list of the roaming consortium OI. If a service provider is selected, the UE (i) constructs a NAI (e.g. decorated NAI for VPLMN) when it attempts EAP-AKA authentication over a selected WLAN access network.

This allows a UE to select the preferred 3GPP service provider to authenticate with upon selecting WLAN based, among other information, on the list of roaming consortium that the UE may discover from the WLAN AP, e.g. by means of HS2.0 ANQP query or beacon message if the AP is HS2.0 capable.

The methods described above may be implemented by hardware. The implementation of the hardware will be described with reference to FIG. 9.

Figure 9:
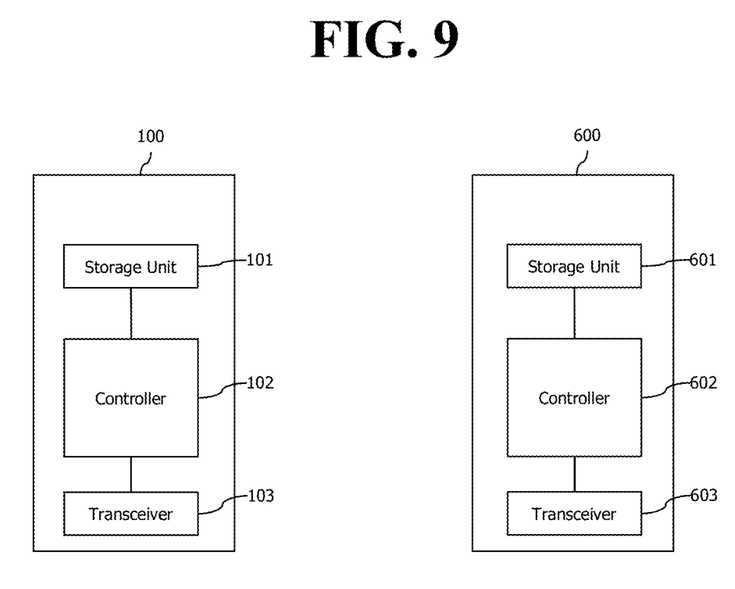
FIG. 9 is a configuration block diagram of a UE 100 and an ANDSF 600 according to the present disclosure.

FIG. 9 is a Configuration Block Diagram of a UE 100 and an ANDSF 600 According to the Present Disclosure.

As illustrated in FIG. 9, the UE 100 includes a storage means 101, a controller 102, and a transmitting/receiving unit 103. In addition, the ANDSF 600 includes a storage means 601, a controller 602, and a transmitting/receiving unit 603.

The storage means 101 and 601 stores the aforementioned methods.

The controllers 102 and 112 control the storage means 101 and 601 and the transmitting/receiving units 103 and 603. In detail, the controllers 102 and 602 execute the methods stored in the storage means 101 and 601. In addition, the controllers 102 and 602 transmit the aforementioned signals through the transmitting/receiving units 103 and 603.

Although preferable embodiments of the present invention has been exemplarily described as above, the scope of the present invention is limited to only the specific embodiments, and as a result, various modifications, changes, or enhancements of the present invention can be made within the spirit of the present invention and the scope disclosed in the appended claims.

What is claimed is:

1. A method for selecting an access point (AP), the method performed by a user equipment and comprising:
receiving a prioritized list with respect to APs, the prioritized list including at least one of: roaming consortium information, a network address identifier (NAI), and a public land mobile network (PLMN) identifier;
scanning at least one or more APs in the vicinity thereby generating an available list, which includes at least one or more service set identifiers (SSIDs) and roaming consortium information;
acquiring at least one or more NAIs from the roaming consortium information included in the available list based on pre-stored mapping information;
comparing the acquired NAI with the NAI in the prioritized list to select a proper AP.

2. The method of claim 1, wherein the acquiring of the NAI includes:
extracting an organization unique identifier (OUI) from the roaming consortium information included in the available list; and
acquiring an NAI corresponding to the extracted OUI based on the pre-stored mapping information.

3. The method of claim 2, wherein the pre-stored mapping information includes an NAI and a PLMN ID corresponding to an OUI.

4. The method of claim 3, further comprising comparing the PLMN ID acquired from the mapping information and the PLMN ID in the prioritized list with each other.

5. The method of claim 1, further comprising:
performing an association to a corresponding AP, when an NAI and a PLMN ID which match the NAI and the PLMN ID in the prioritized list are present; and
performing authentication by using the PLMN ID.

6. The method of claim 1, wherein the scanning includes:
acquiring information on a load and an installation place of the at least one or more APs;
excluding any AP which does not match a predetermined condition from the available list; and
adding any AP which matches the predetermined condition into the available list.

7. The method of claim 6, wherein the predetermined condition includes at least one of:
a condition for the load of the AP; and
a condition for the load for the installation place of the AP.

8. The method of claim 1, wherein an entity in a network providing the prioritized list is an access network discovery and selection function (ANDSF).

9. A terminal, comprising:
a transmitting/receiving unit configured to receive a prioritized list with respect to access points (APs) from an entity in a network, the prioritized list including at least one of: roaming consortium information, a network address identifier (NAI), and a public land mobile network (PLMN) identifier; and a processor configured to:
- scan APs in the vicinity thereby generating an available list including a service set identifier (SSID) and roaming consortium information,
- acquire an NAI from the roaming consortium information included in the available list, based on pre-stored mapping information, and
- compare the acquired NAI with the NAI included in the prioritized list.

10. The terminal of claim 9, wherein the acquiring of the processor includes:
- extracting an organizational unique identifier (OUI) from the roaming consortium information in the available list; and
- acquiring an NAI corresponding to the extracted OUI by using the pre-stored mapping information.

11. The terminal of claim 10, wherein the pre-stored mapping information includes an NAI and a PLMN ID corresponding to an OUI.

12. The terminal of claim 11, wherein the processor is further configured to compare the PLMN ID acquired from the mapping information and the PLMN ID in the prioritized list with each other.

13. The terminal of claim 9, wherein the processor is further configured to:
- perform an association to a corresponding AP when an NAI and a PLMN ID which match the NAI and the PLMN ID in the prioritized list are present; and
- perform authentication by using the PLMN ID.

14. The terminal of claim 9, wherein the scanning of the processor includes:
- acquiring information on a load and an installation place of the at least one or more APs
- excluding any AP which does not match a predetermined condition from the available list; and
- adding any AP which matches the predetermined condition into the available list.

15. The terminal of claim 14, wherein the predetermined condition includes at least one of:
- a condition for the load of the AP; and
- a condition for the load for the installation place of the AP.

* * * * *